(12) United States Patent
Tack et al.

(10) Patent No.: US 11,649,076 B2
(45) Date of Patent: May 16, 2023

(54) SPACE OBJECT MANEUVER DETECTION

(71) Applicant: Raytheon Company, Waltham, MA (US)

(72) Inventors: Jonsimon Tack, State College, PA (US); Christine Nezda, Richardson, TX (US)

(73) Assignee: Raytheon Company, Waltham, MA (US)

( * ) Notice: Subject to any disclaimer, the term of this patent is extended or adjusted under 35 U.S.C. 154(b) by 569 days.

(21) Appl. No.: 16/796,175

(22) Filed: Feb. 20, 2020

(65) Prior Publication Data

US 2021/0261276 A1    Aug. 26, 2021

(51) Int. Cl.
*B64G 3/00*    (2006.01)
*G06N 3/08*    (2006.01)
*B64G 1/24*    (2006.01)
*G06N 3/088*   (2023.01)

(52) U.S. Cl.
CPC .............. *B64G 3/00* (2013.01); *B64G 1/242* (2013.01); *B64G 1/244* (2019.05); *G06N 3/088* (2013.01); *B64G 2001/245* (2013.01); *B64G 2001/247* (2013.01)

(58) Field of Classification Search
CPC .......... B64G 3/00; B64G 1/242; B64G 1/244; B64G 2001/245; B64G 2001/247; G06N 3/088; G06N 7/005; G06N 20/00
See application file for complete search history.

(56) References Cited

U.S. PATENT DOCUMENTS

| | | | | |
|---|---|---|---|---|
| 8,825,399 B2* | 9/2014 | Vance | ...................... | B64G 1/36 |
| | | | | 701/13 |
| 9,292,792 B1* | 3/2016 | Pedersen | .............. | G06K 9/6261 |
| 10,476,584 B1* | 11/2019 | Minelli | .................. | H04B 17/18 |
| 10,677,716 B1* | 6/2020 | Hart | .......................... | G01H 9/00 |
| 2006/0229813 A1* | 10/2006 | Tobiska | .................. | G01W 1/10 |
| | | | | 702/2 |
| 2014/0367523 A1* | 12/2014 | Kitazawa | ............... | B64G 1/646 |
| | | | | 244/158.4 |
| 2016/0188176 A1* | 6/2016 | Runnels | .................... | B64G 3/00 |
| | | | | 715/788 |

(Continued)

FOREIGN PATENT DOCUMENTS

WO    WO-2020085412 A1 *   4/2020

OTHER PUBLICATIONS

Satellite Maneuver Detection Using Two-line Element (TLE) Data, Tom Kelecy Boeing LTS, Colorado Springs, CO / Kihei, HI Doyle Hall Boeing LTS, Colorado Springs, CO / Kihei, HI (Year: 2007).*

(Continued)

*Primary Examiner* — Donald J Wallace
*Assistant Examiner* — Jalal C Coduroglu
(74) *Attorney, Agent, or Firm* — Schwegman Lundberg & Woessner, P.A.

(57) ABSTRACT

A system detects a maneuver of at least one space object by receiving a first data set relating to orbital characteristics of at least one space debris object. The system trains a model, using the first data set, in order to model orbital behaviors of the at least one space debris object. The system then receives a second data set relating to orbital characteristics of the at least one space object, and detects a maneuver of the at least one space object using the trained model and the second data set.

20 Claims, 5 Drawing Sheets

(56) References Cited

U.S. PATENT DOCUMENTS

| | | | | |
|---|---|---|---|---|
| 2016/0264268 A1* | 9/2016 | Aylmer | ................. | B64G 3/00 |
| 2017/0331710 A1* | 11/2017 | Cody | ................... | H04L 43/067 |
| 2018/0189428 A1* | 7/2018 | McKennon-Kelly | ... | G06F 30/20 |
| 2020/0154977 A1* | 5/2020 | Everson | ............... | B25B 13/481 |
| 2021/0011148 A1* | 1/2021 | Blondel | ................. | B64G 3/00 |
| 2021/0103841 A1* | 4/2021 | Shen | ...................... | G06N 3/08 |
| 2021/0261276 A1* | 8/2021 | Tack | ..................... | B64G 1/242 |

OTHER PUBLICATIONS

2017 IEEE Aerospace Conference Technical Cosponsors Yellowstone Conference Center, Big Sky, Montana Mar. 4-11, 2017 Conference Digest (Year: 2017).*

A Machine Learning Approach to Modeling Satellite Behavior 2019 IEEE International Conference on Space Mission Challenges for Information Technology (SMC-IT) Rohit Mital, Joseph Coughlin, Kim Cates, & Geetha Ganji (Year: 2019).*

Hundman, Kyle, et al., "Detecting Spacecraft Anomalies Using LSTMs and Nonparametric Dynamic Thresholding", Proceedings of the 24th ACM SIGKDD International Conference on Knowledge Discovery & Data Mining. Applied Data Science Track Paper., (2018), 387-395.

Kelecy, Tom, et al., "Satellite Maneuver Detection Using Two-Line-Elements Data", Proceedings of the Advanced Maui Optical and Space Surveillance Technologies Conference., (2007), 16 pgs.

* cited by examiner

SPACE OBJECT MANEUVER DETECTION

TECHNICAL FIELD

Embodiments described herein generally relate to systems and methods for detecting a maneuver of a space object, e.g. a satellite, and in an embodiment, but not by way of limitation, detecting a maneuver of a satellite using a trained model and a North American Aerospace Defense Command (NORAD) two-line-element data set.

BACKGROUND

Timely detection of unannounced satellite maneuvers can be critical for the United States and its allies in order to maintain effective space situational awareness. While satellites execute maneuvers for a variety of benign reasons, including station-keeping, orbital adjustments, and collision avoidance, space is a contested domain, and adversaries conduct unannounced maneuvers in order to perform rendezvous and proximity operations that can threaten satellites of the U.S. and its allies. Consequently, having the ability to timely detect satellite maneuvers would provide the U.S. and its allies early indications of potentially hostile or dangerous actions.

To this end, the U.S. tracks space objects, including active satellites and debris, regardless of the country of origin, in order to ensure safety and maintain space situational awareness. This information is published in the North American Aerospace Defense Command (NORAD) two-line-elements (TLE) data set. Even though the U.S. military tracks and publishes space object orbital information, the large number of satellites makes the timely detection of maneuvers from the TLE data set difficult. For example, the number of space objects to track in the year 2019 was on the order of 10,000, and that number continues to rapidly grow. Therefore, effective methods of detecting maneuvers from the TLE data set would be advantageous. While others have previously used the TLE data sets in connection with satellite maneuver detection, such approaches have used rules-based methods, which can be time consuming and lack accuracy. Additionally, others have created satellite maneuver prediction algorithms that use machine learning on a training set from a single orbital variable (mean motion). These approaches suffer from lack of training data as they require labeled maneuvers to train a recurrent neural network, data that are rarely available.

Satellite conjunctions are when two satellites experience their least separation distance. The number of satellite or space object conjunctions during any particular time period can be large. For example, for a 30 km conjunction distance, there can be approximately 400,000 conjunctions among satellites and debris during a 24-hour period. It is therefore not feasible to examine all conjunctions for potential rendezvous and proximity operations. Approaches to select the "interesting" conjunctions are therefore needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

One or more embodiments of the present disclosure detect maneuvers of satellites and space debris and also significantly reduce the number of conjunctions that need be considered in order to maintain space situational awareness.

Figures 3A, 3B:
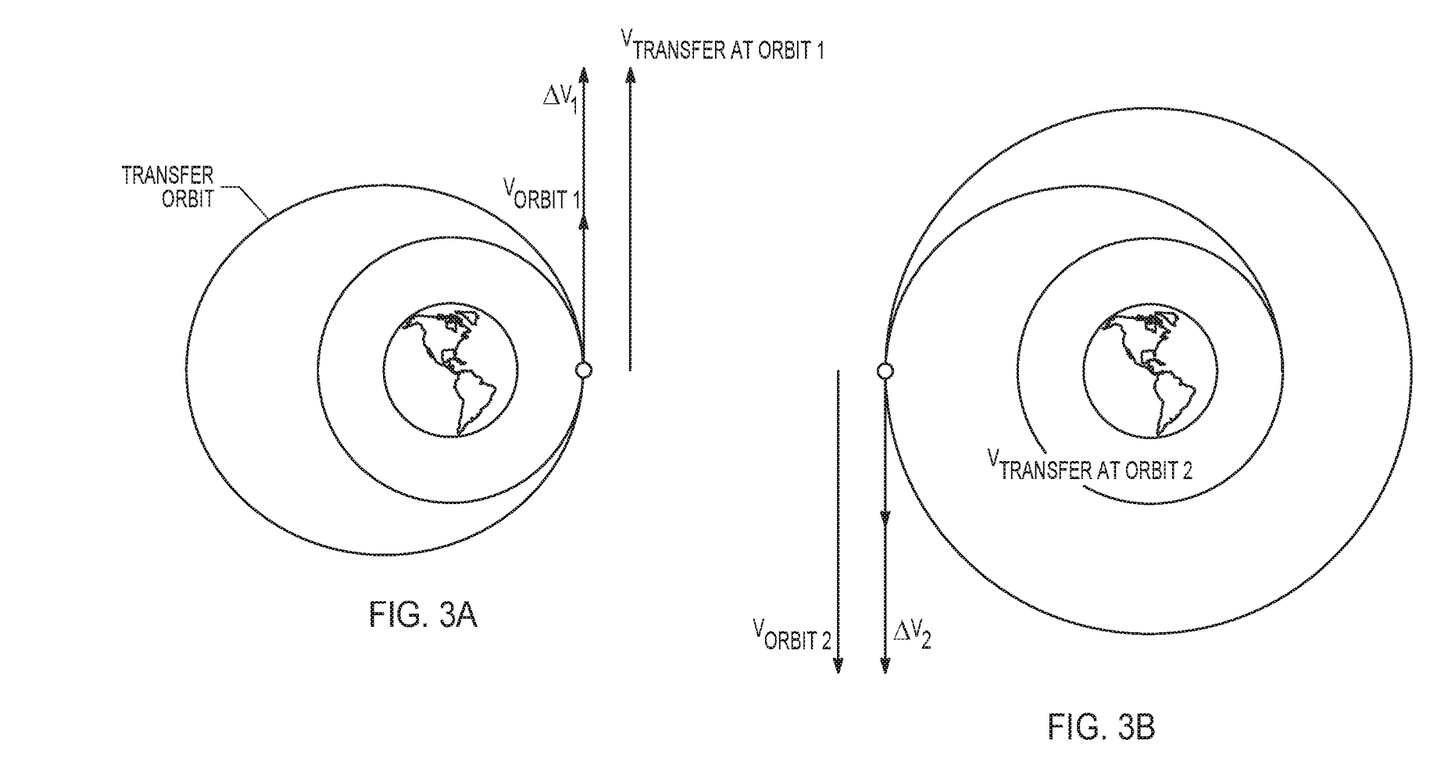
FIGS. 3A and 3B are a diagram illustrating a change of orbit for a satellite.

An embodiment is based on the insight that the primary difference between the behavior of space debris and active satellites is that satellites maneuver. For example, referring to FIG. 3A, a satellite can move from a first orbit $V_{orbit\ 1}$ to a transfer orbit caused in part by $\Delta V_1$ However, the transfer orbit can be off-center. FIG. 3B illustrates how the satellite can be re-centered via a $\Delta V_2$. The detection of such maneuvers can be very useful in maintaining space situational awareness.

Unlike prior approaches, an embodiment takes an unsupervised data-driven approach to the problem by using anomaly detection with respect to the behavior of known orbital debris, and then computes anomalies using a data clustering technique. The clustering technique builds a statistical model of behavior derived from the orbital elements of known space debris. An embodiment then uses the debris model to detect anomalous satellite behavior from the orbital elements of known satellites and space objects of unknown type with respect to debris behavior. One clustering technique that can be used is a hierarchical Gaussian mixture model. Other possible clustering techniques also apply, such as Hierarchical Agglomerative Clustering, DBScan, or K-Means. A model is trained on known space debris objects, and the trained model is then used to detect anomalies for satellite NORAD two-line-element (TLE) entries with respect to the trained model. The resulting anomalies indicate points at which the satellites acted differently than debris, which indicate maneuvers, which in turn indicate that the debris/object under consideration is a satellite and not a non-satellite piece of debris.

This determination of satellite maneuvers can be used in connection with satellite and space debris conjunctions. Another embodiment identifies a reduced set of conjunctions of interest for rendezvous and proximity operations by combining conjunction detection with the historical maneuvers of the space objects involved. Conjunctions between objects where at least one of the objects has recently maneuvered are flagged for further analysis.

Figure 5A:
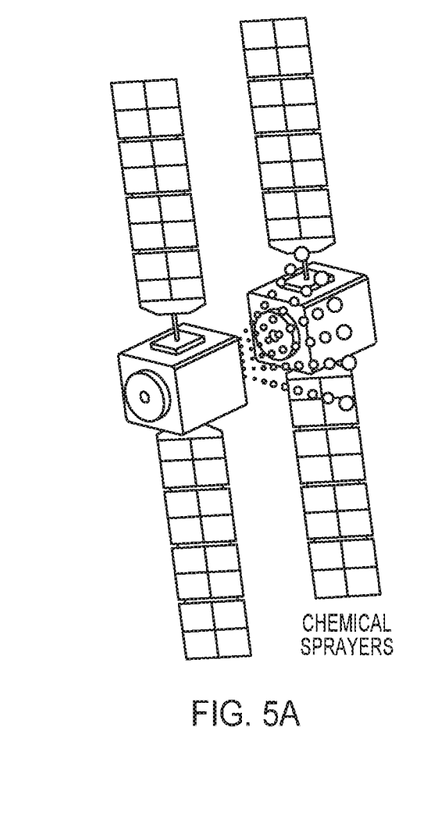
FIGS. 5A, 5B, and 5C is a block diagram of a computer architecture upon which one or more embodiments of the present disclosure can execute.
Figure 5B:
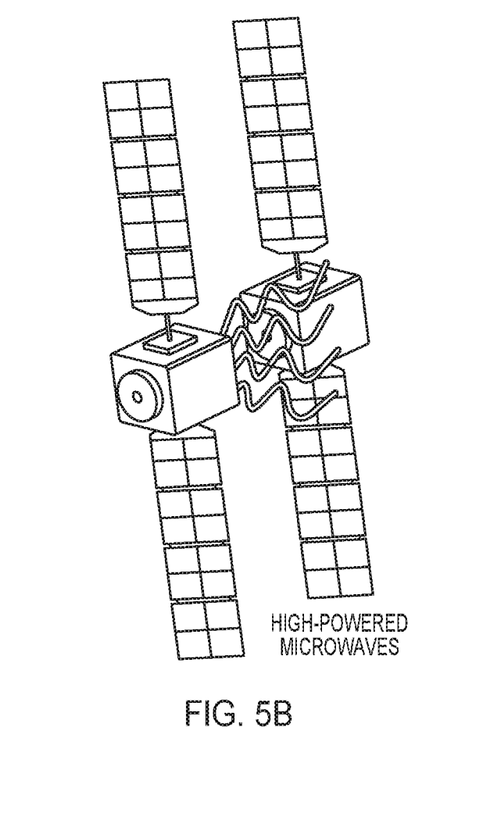
Figure 5C:
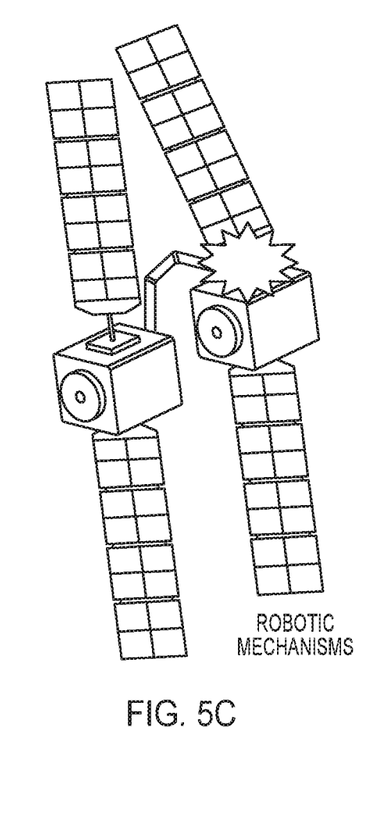

Specifically, conjunctions resulting from recent satellite maneuvers are of particular interest to military satellite operators because they may indicate the purposeful approach of one satellite by another. For example, as illustrated in FIGS. 5A, 5B, and 5C, a first satellite can approach a second satellite for purposes of spraying a chemical on the second satellite by the first satellite, transmitting high-power microwaves from the first satellite to the second satellite, and using a robotic mechanism on the first satellite to work on the second satellite. These purposeful approaches can be either benign or nefarious. Filtering the plethora of conjunctions by recent satellite maneuvers can provide a significant reduction in the number of conjunctions to examine for potential rendezvous and proximity operations against U.S. assets and the assets of U.S. allies. The same is applicable to commercial satellites operated by commercial competitive entities who may wish to monitor such behaviors to keep track of potential rendezvous and proximity operations against each other.

Given a list of space object conjunctions, and a time period history (e.g., 30 days) of satellite maneuvers, this embodiment identifies conjunctions that involve a space object that has maneuvered during that time period. Such conjunctions can be labeled as "Maneuver Conjunctions," and can be prioritized for further analysis. This embodiment can yield a one hundred-fold or more reduction in daily conjunctions of interest than unfiltered conjunction detection. For example, if on a particular day there are about 400,000 conjunctions within a 30 km conjunction distance, the filtering of the embodiment can reduce the number of conjunctions to about 7,000—a one-hundred-fold decrease. Additional filters can be applied to reduce the number of conjunctions of interest further. For example, filtering conjunctions by a conjunction distance of 10 km or less, filtering conjunctions based on payloads or type of space object, and filtering based on countries that control the satellites, can in this example reduce the number of conjunctions of interest to about 130, which is a thousand-fold decrease.

Figure 1:
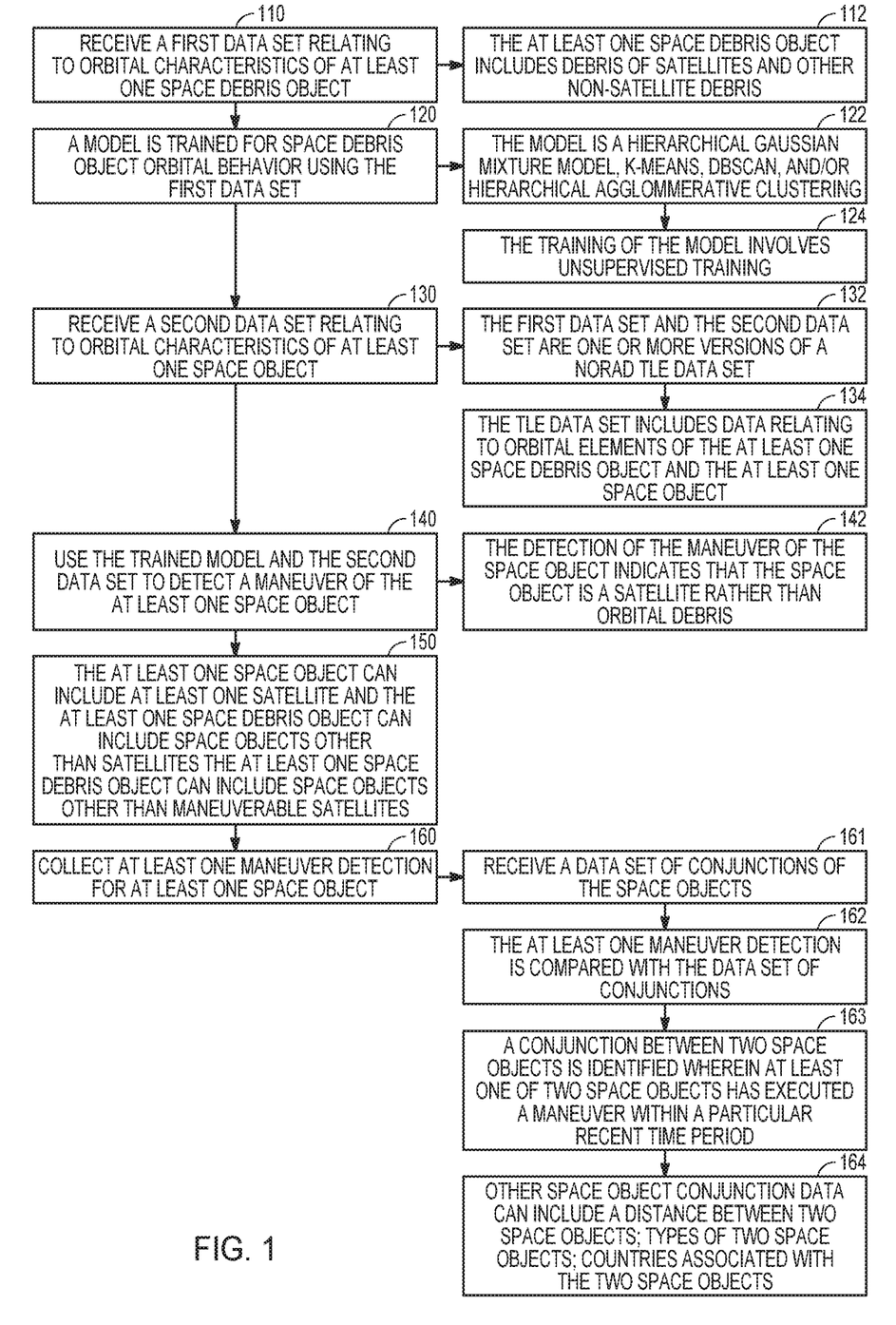
FIG. 1 is a flow diagram for a process to detect satellite and space debris maneuvers and to filter satellite and space debris conjunctions.

FIG. 1 is a diagram illustrating a process to detect maneuvers of satellites and space debris and to reduce the number of satellite and space debris conjunctions that need be considered in order to maintain space situational awareness. FIG. 1 includes process blocks 110-164. Though arranged substantially serially in the examples of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 1, at 110, a process to detect a maneuver of a space object receives a first data set. This first data set relates to orbital characteristics of at least one space debris object. As indicated at 112, the at least one space debris object can include debris of satellites and other non-satellite debris. At 120, a model is trained using this first data set. This training models orbital behaviors of the at least one space debris object. As indicated at 122, the model can be a hierarchical Gaussian mixture model. Also, K-Means, DBScan, and Hierarchical Agglommerative Clustering can be used. As further indicated at 124, the training of the model involves an unsupervised training. In some embodiments, the first data set is indicative of orbital characteristics (e.g., as represented by orbital parameters discussed below) of a variety of space debris objects and is used to train the model. In some such embodiments, training the model comprises modeling the orbital behaviors of the variety of space debris objects.

Figure 4:
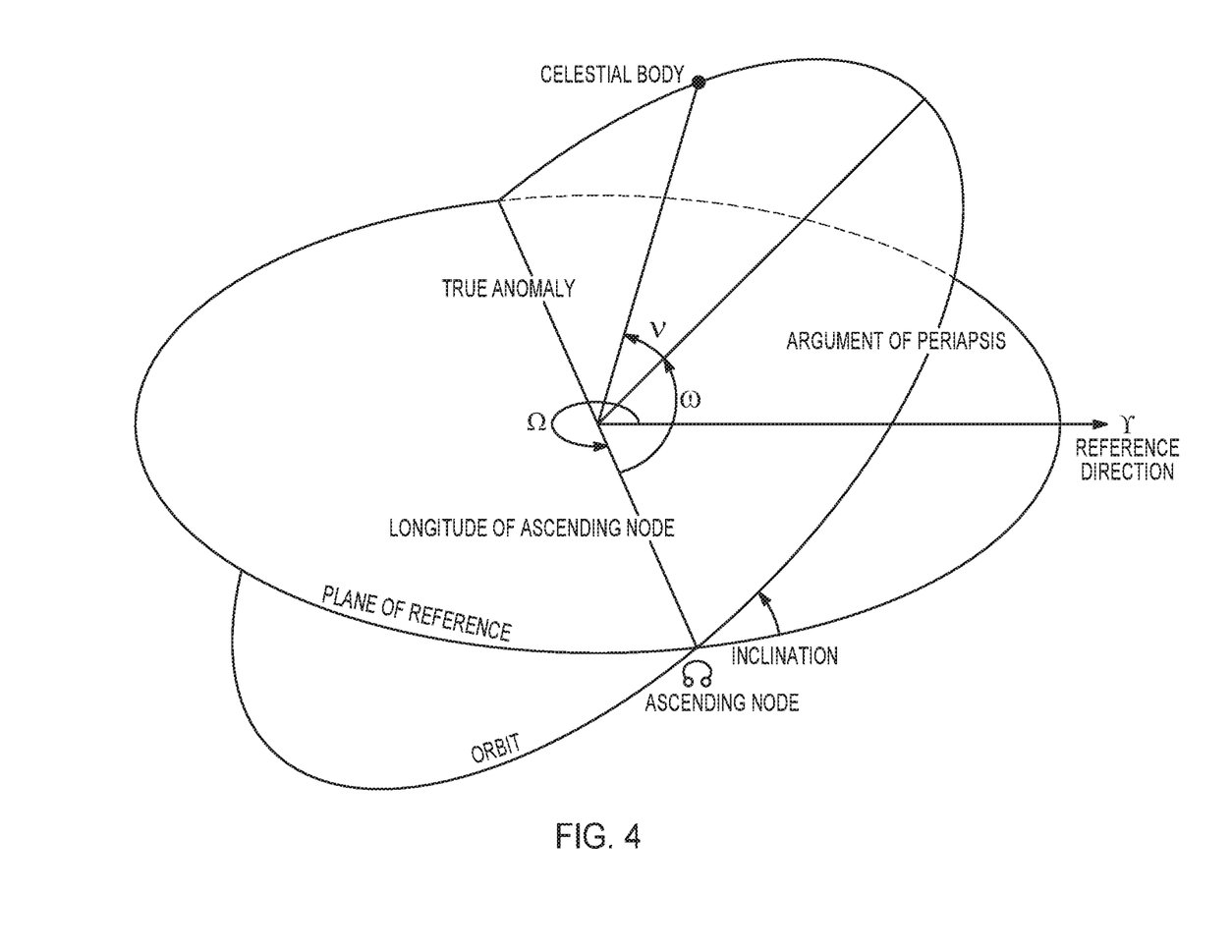
FIG. 4 illustrates several of the orbital elements included in a NORAD TLE data record.

At 130, the process receives a second data set. This second data set relates to orbital characteristics of at least one space object. As indicated at 132, the first data set and the second data set are one or more versions of a North American Aerospace Defense Command (NORAD) two-line-element (TLE) data set. More particularly, the first data set is a historical set of TLE data of the at least one space debris object that is used to train the model, and the second data set is a TLE data set of the at least one space object for which the process is determining possible maneuvers. As further indicated at 134, as is known to those of skill in the art, the first TLE data set and the second TLE data set includes orbital elements of the at least one space debris object and the at least one space object respectively. Specifically, the first and second TLE data sets can include data relating to an inclination, a first derivative of mean motion, a second derivative of mean motion, a radiation pressure coefficient, a right ascension of an ascending node, an eccentricity, a perigee, a mean anomaly, and a mean motion. FIG. 4 illustrates some of these orbital elements and others as they relate to a celestial body. Specifically FIG. 4 illustrates a plane of reference and an orbit of the celestial body, an inclination, a true anomaly, an argument of periapsis, an ascending node, a longitude of the ascending node, and a reference direction.

At 140, the process detects a maneuver of the at least one space object using the trained model and the second data. As indicated at 142, the detection of the maneuver of the space object indicates that the space object is a satellite rather than space debris.

As indicated at 150, the at least one space object can include at least one satellite, and the at least one space debris object can include space objects other than maneuverable satellites.

As indicated above, the detection of maneuvers of space objects can be combined with space object conjunction data to filter the space object conjunction data and ease the burden of analyzing the numerous daily conjunctions of space objects. This process is outlined in operations 160-164. Specifically, at 160, the process collects maneuver detections for at least one space object. At 161, a data set of conjunctions of the space objects is received. At 162, the maneuver detections are compared with the data set of conjunctions, and at 163, a conjunction between two space objects is identified wherein at least one of the two space objects has executed a maneuver within a particular recent time period. In an embodiment, a recent time period is any period up to 30 days before the detected conjunction. In other embodiments, other space object conjunction data can be used as a filter. For example, as indicated at 164, only conjunctions that involve a certain minimum distance between two space objects are considered, only conjunctions between certain types of space objects are considered, and/or only conjunctions between two space objects of certain countries are considered.

Figure 2:
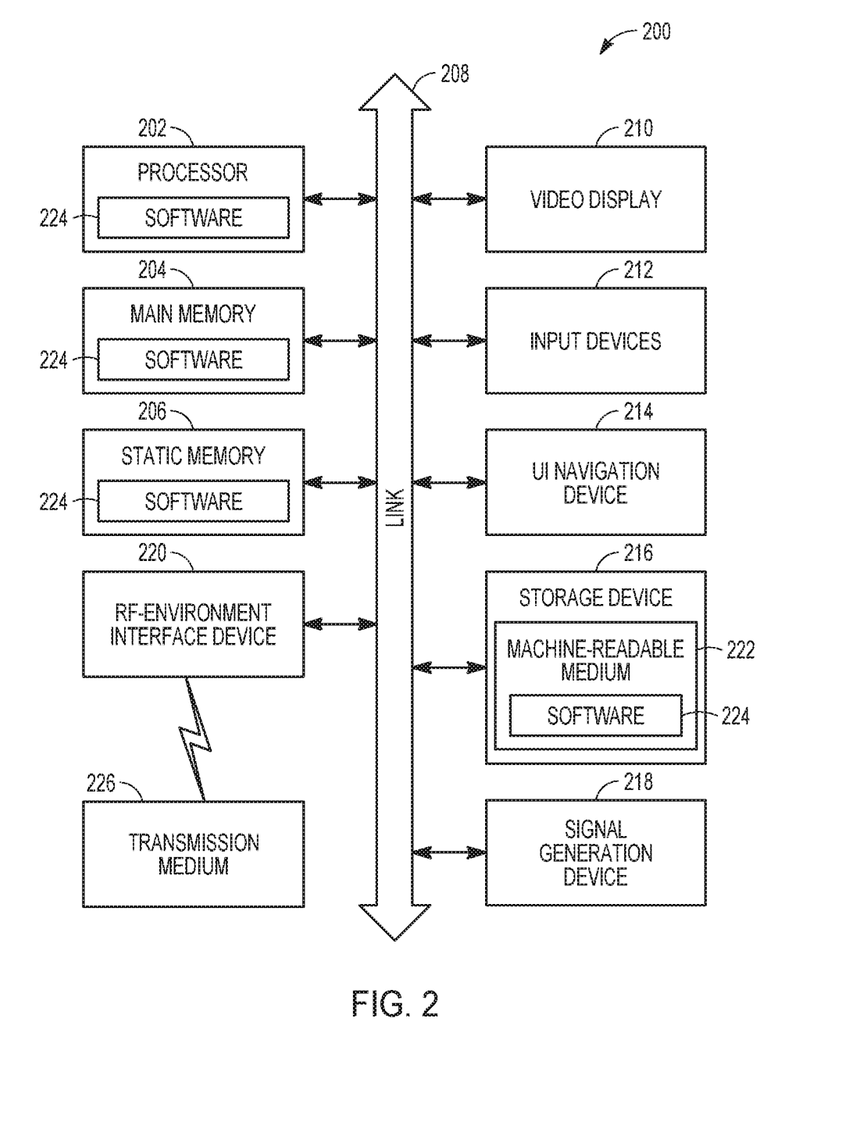
FIG. 2 is a block diagram of a computer architecture upon which one or more embodiments of the present disclosure can execute.

FIG. 2 is a block diagram illustrating a computing and communications platform 200 in the example form of a general-purpose machine on which some or all the operations of FIG. 1 may be carried out according to various embodiments. In certain embodiments, programming of the computing platform 200 according to one or more particular algorithms produces a special-purpose machine upon execution of that programming. In a networked deployment, the computing platform 200 may operate in the capacity of either a server or a client machine in server-client network environments, or it may act as a peer machine in peer-to-peer (or distributed) network environments.

Example computing platform 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computing platform 200 may further include a video display unit 210, input devices 212 (e.g., a keyboard, camera, microphone), and a user interface (UI) navigation device 214 (e.g., mouse, touchscreen). The computing platform 200 may additionally include a storage device 216 (e.g., a drive unit), a signal generation device 218 (e.g., a speaker), and a RF-environment interface device (RFEID) 220.

The storage device 216 includes a non-transitory machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computing platform 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 220 includes radio receiver circuitry, along with analog-to-digital conversion circuitry, and interface circuitry to communicate via link 208 according to various embodiments. Various form factors are contemplated for RFEID 220. For instance, RFEID may be in the form of a wideband radio receiver, or scanning radio receiver, that interfaces with processor 202 via link 208. In one example, link 208 includes a PCI Express (PCIe) bus, including a slot into which the NIC form-factor may removably engage. In another embodiment, RFEID 220 includes circuitry laid out on a motherboard together with local link circuitry, processor interface circuitry, other input/output circuitry, memory circuitry, storage device and peripheral controller circuitry, and the like. In another embodiment, RFEID 220 is a peripheral that interfaces with link 208 via a peripheral input/output port such as a universal serial bus (USB) port. RFEID 220 receives RF emissions over wireless transmission medium 226. RFEID 220 may be constructed to receive RADAR signaling, radio communications signaling, unintentional emissions, or some combination of such emissions.

Examples, as described herein, may include, or may operate on, logic or a number of components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process to detect a maneuver of a maneuverable space object comprising:
    receiving into a computer processor a first data set relating to orbital characteristics of only non-maneuvering space debris objects;
    training a model, using the first data set, to model orbital behaviors of the non-maneuvering space debris objects;
    receiving into the computer processor a second data set relating to orbital characteristics of the maneuverable space object; and
    detecting a maneuver of the maneuverable space object using the trained model and the second data set.

2. The process of claim 1, wherein the first data set and the second data set comprise one or more versions of a North American Aerospace Defense Command (NORAD) two-line-element (TLE) data set.

3. The process of claim 1, wherein the model comprises one or more of a hierarchical Gaussian mixture model, K-Means, DBScan, and Hierarchical Agglommerative Clustering.

4. The process of claim 1, wherein the first data set and the second data set comprise orbital elements of the non-maneuvering space debris objects and the maneuverable, space object respectively, including an inclination, a first derivative of mean motion, a second derivative of mean motion, a radiation pressure coefficient, a right ascension of an ascending node, an eccentricity, a perigee, a mean anomaly, and a mean motion.

5. The process of claim 1, wherein the maneuverable space object comprises a satellite.

6. The process of claim 1, wherein the detection of the maneuver of the maneuverable space object indicates that the space object is a satellite.

7. The process of claim 1, wherein the training of the model comprises an unsupervised training.

8. The process of claim 1, comprising:
    collecting, by the model, at least one maneuver detection for space object;
    receiving into the computer processor a data set of possible conjunctions of a plurality of space objects;
    comparing the at least one maneuver detection with the data set of possible conjunctions; and
    identifying an actual conjunction between two space objects wherein at least one of the two space objects has executed a maneuver within a specified time period and the two space objects are part of a possible conjunction in the data set of possible conjunctions.

9. The process of claim 8, wherein the comparing of the at least one maneuver detection with the data set of possible conjunctions comprises one or more of a comparison of a distance between the two space objects, a comparison of types of the two space objects, and a comparison of countries from which the two space objects originated, and the specified time period is relative to a time of the possible conjunction.

10. The process of claim 1, wherein the space object comprises at least one satellite; and wherein the space debris objects comprise non-maneuvering space objects other than maneuverable satellites.

11. The process of claim 1, wherein the first data set is representative of orbital characteristics of only a plurality of non-maneuvering space debris objects, and wherein training the model comprises modeling the orbital behaviors of only the non-maneuvering plurality of space debris objects.

12. A non-transitory computer readable medium comprising instructions that when executed b a computer processor execute a process to detect a maneuver of a maneuverable space object comprising:
    receiving into the computer processor a first data set relating to orbital characteristics of only non-maneuvering space debris objects;
    training a model, using the first data set, in order to model orbital behaviors of the non-maneuvering space debris objects;
    receiving into the computer processor a second data set relating to orbital characteristics of the maneuverable space object; and
    detecting a maneuver of the maneuverable space object using the trained model and the second data set.

13. The non-transitory computer readable medium of claim 12, wherein the first data set and the second data set comprise one or more versions of a North American Aerospace Defense Command (NORAD) two-line-element (TLE) data set.

14. The non-transitory computer readable medium of claim 12, wherein the model comprises one or more of a hierarchical Gaussian mixture model, K-Means, DBScan, and Hierarchical Agglommerative Clustering.

15. The non-transitory computer readable medium of claim 12, wherein the first data set and the second data set comprise orbital elements of the non-maneuvering space debris objects and the maneuverable space object respectively including an inclination, a first derivative of mean motion, a second derivative of mean motion, a radiation pressure coefficient, a right ascension of an ascending node, an eccentricity, a perigee, a mean anomaly, and a mean motion.

16. The non-transitory computer readable medium of claim 12, wherein the maneuverable space object comprises a satellite.

17. The non-transitory computer readable medium of claim 12, wherein the detection of the maneuver of the maneuverable space object indicates that the maneuverable space object is a satellite.

18. The non-transitory computer readable medium of claim 12, comprising instructions for:

collecting at least one maneuver detection for unclassified space objects;

receiving into the computer processor a data set of conjunctions of the unclassified space objects;

comparing the at least one maneuver detection with the data set of conjunctions; and identifying a conjunction between two space objects of the unclassified space objects wherein a space object of the two space objects is the maneuverable space object and has been determined, by the model, to have executed a maneuver within a specified time time period of detecting the conjunction.

19. The non-transitory computer readable medium of claim 18, wherein the comparing of the at least one maneuver detection with the data set of conjunctions comprises one or more of a comparison of a distance between the two space objects, a comparison of types of the two space objects, and a comparison of countries from which the two space objects originated.

20. A system comprising:
a computer processor; and
a computer memory coupled to the computer processor;
wherein one or more of the computer processor and the computer memory are operable for detecting a maneuver of at least one maneuverable space object by:

receiving into the computer processor a first data set relating to orbital characteristics of only non-maneuvering space debris objects;

training a model, using the first data set, to model orbital behaviors of only the non-maneuvering space debris objects;

receiving into the computer processor a second data set relating to orbital characteristics of the maneuverable space object;

detecting a maneuver of the maneuverable space object using the trained model and the second data set;

collecting at least one maneuver detection for the maneuverable space object;

receiving into the computer processor a data set of conjunctions of a plurality of unclassified space objects;

comparing the at least one maneuver detection with the data set of conjunctions; and identifying a conjunction between two space objects of the unclassified space objects wherein a space object of the two space objects is the maneuverable space object and has been determined, by the model, to have executed a maneuver within a specified time time period of detecting the conjunction.

* * * * *